United States Patent
Grossenbacher et al.

(10) Patent No.: US 9,453,287 B2
(45) Date of Patent: Sep. 27, 2016

(54) CERAMIC ELEMENT INLAID WITH AT LEAST ONE METALLIC DECORATION

(75) Inventors: Pascal Grossenbacher, Neuchâtel (CH); Michel Caillaud, Villers-le-Lac (FR); Alexandre Netuschill, Le Prévoux (CH)

(73) Assignee: OMEGA SA, Biel/Bienne (CH)

( * ) Notice: Subject to any disclaimer, the term of this patent is extended or adjusted under 35 U.S.C. 154(b) by 1020 days.

(21) Appl. No.: 13/093,559

(22) Filed: Apr. 25, 2011

(65) Prior Publication Data

US 2011/0259753 A1    Oct. 27, 2011

(30) Foreign Application Priority Data

Apr. 23, 2010 (EP) .................................. 10160893

(51) Int. Cl.
| | |
|---|---|
| C25D 5/00 | (2006.01) |
| C25D 5/10 | (2006.01) |
| B44C 1/26 | (2006.01) |
| C04B 41/00 | (2006.01) |
| C04B 41/52 | (2006.01) |
| C04B 41/90 | (2006.01) |
| G04B 19/18 | (2006.01) |
| G04B 19/28 | (2006.01) |

(52) U.S. Cl.
CPC . *C25D 5/00* (2013.01); *B44C 1/26* (2013.01); *C04B 41/009* (2013.01); *C04B 41/52* (2013.01); *C04B 41/90* (2013.01); *C25D 5/10* (2013.01); *G04B 19/18* (2013.01); *G04B 19/28* (2013.01)

(58) Field of Classification Search
None
See application file for complete search history.

(56) References Cited

U.S. PATENT DOCUMENTS

| | | | | |
|---|---|---|---|---|
| 3,910,031 A | * | 10/1975 | Keida | 368/281 |
| 4,517,217 A | | 5/1985 | Hoffman | |
| 4,666,737 A | * | 5/1987 | Gimpelson et al. | 438/629 |
| 4,742,030 A | * | 5/1988 | Masaki et al. | 501/105 |
| 5,178,725 A | * | 1/1993 | Takeno et al. | 216/87 |
| 5,760,367 A | * | 6/1998 | Rosenwasser et al. | 219/121.69 |
| 6,066,386 A | * | 5/2000 | Boyko et al. | 428/209 |
| 7,121,717 B2 | | 10/2006 | Grippo et al. | |
| 2005/0031788 A1 | * | 2/2005 | McCaskie et al. | 427/305 |
| 2005/0136284 A1 | | 6/2005 | Grippo et al. | |

FOREIGN PATENT DOCUMENTS

| | | |
|---|---|---|
| EP | 0 106 806 A1 | 4/1984 |
| EP | 0 230 853 A1 | 8/1987 |

(Continued)

OTHER PUBLICATIONS

Search Report issued in corresponding European application 10 16 0893, completed Sep. 27, 2010.

*Primary Examiner* — Harry D Wilkins, III
(74) *Attorney, Agent, or Firm* — Oblon, McClelland, Maier & Neustadt, L.L.P.

(57) ABSTRACT

The invention relates to an inlaid ceramic decoration (10) including a ceramic body (11) that has at least one recess (12) forming the pattern for a decoration (13). According to the invention, said at least one recess is entirely filled by first and second electrically conductive layers (14, 15) of approximately 50 nm and a metallic galvanic plating (16) so as to form a ceramic element (10) inlaid with at least one metallic decoration (13) with improved visual rendering.
The invention also relates to the method of manufacturing the inlaid ceramic element.
The invention concerns the field of decorated ceramic parts.

14 Claims, 3 Drawing Sheets

(56) References Cited

FOREIGN PATENT DOCUMENTS

| EP | 1 548 524 A1 | 6/2005 |
| FR | 2 491 956 A1 | 4/1982 |
| JP | 5-214550 A | 8/1993 |

\* cited by examiner

Fig. 1
Fig. 2
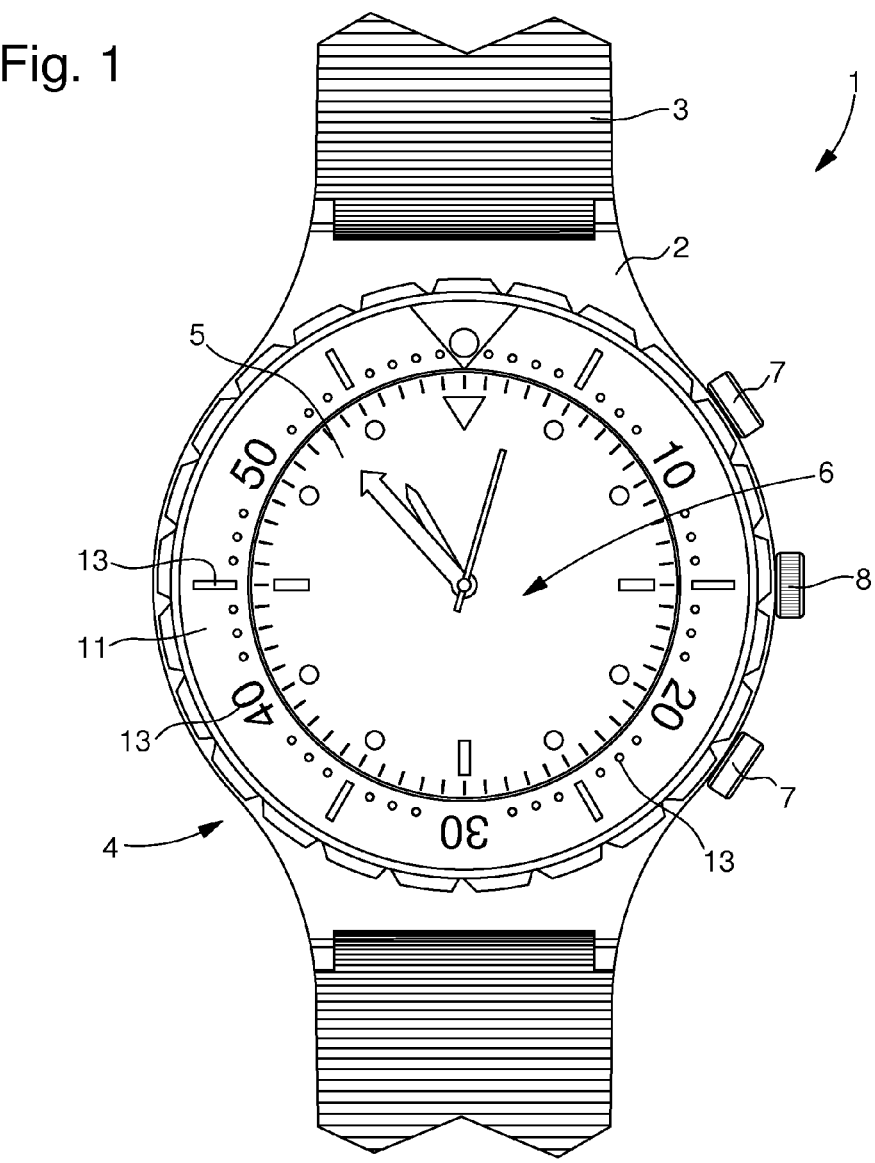
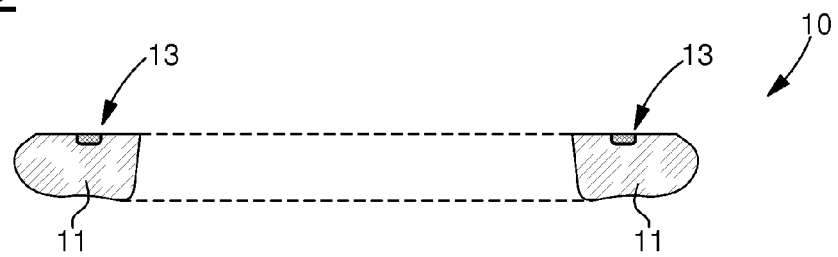

CERAMIC ELEMENT INLAID WITH AT LEAST ONE METALLIC DECORATION

This application claims priority from European Patent Application No. 10160893.3 filed Apr. 23, 2010, the entire disclosure of which is incorporated herein by reference.

FIELD OF THE INVENTION

The invention relates to a ceramic element inlaid with at least one metallic decoration and more specifically an element of this type that is intended to be mounted in a timepiece.

BACKGROUND OF THE INVENTION

It is known to form watch bezels at least partially made of synthetic sapphire in order to show, through transparency, a deposit plated in a recess underneath the bezel, for example, forming a scale or a brand name. This configuration has the advantage of protecting the deposit from any mechanical degradation by totally covering it with the sapphire part. However, this configuration may make it difficult to read the decoration because of the transmitted colouring of the deposit fades but also because of the lack of difference in colour between the sapphire and the deposit.

SUMMARY OF THE INVENTION

It is an object of the present invention to overcome all or part of the aforementioned drawbacks, while maintaining the advantage of mechanical resistance and adding the advantage of improved visual quality.

The invention therefore relates to a method of manufacturing an inlaid ceramic element including the following steps:
a) forming a ceramic body;
b) etching at least one recess in one face of the ceramic body, each at least one recess forming the pattern for a decoration;
c) depositing a first layer of approximately 50 nm over the entire face including said at least one recess;
d) depositing a second electrically conductive layer of approximately 50 nm over the entire face including said at least one recess, so as to cover the first layer;
e) depositing galvanically a metallic material or its alloy from the second conductive layer so as to completely fill said at least one recess;
f) removing all the deposits from the surface of the ceramic body, except from the hollow of said at least one recess.

It is immediately clear that the variety of shades of the decoration and/or the ceramic is no longer limited by the transparency of the latter and yet good wear resistance is still ensured. By way of example, it is thus possible to obtain a complex visual rendering by giving the ceramic a brilliant aspect and each decoration a satin finish. Advantageously, it is also clear that the ceramic element can, in particular, form either all or part of a timepiece, i.e. a case, bracelet, bezel, dial, crystal, push button and/or a watch crown. The invention may also be applied to all or part of a piece of jewelry or even be applied to tableware.

In accordance with other advantageous features of the invention:
step a) is achieved by sintering;
the ceramic body is zirconia-based;
step b) is performed by laser;
each at least one recess has an inner surface free of edges so as to facilitate implementation of step e);
step c) is achieved by auto-catalytic plating or by vapour phase deposition;
the first electrically conductive layer is a Cr, $Cr_2N$, TiN, TiW, Ni, NiP, Cu, Ti or Zr layer;
step d) is achieved by vapour phase deposition;
the second electrically conductive layer includes gold and/or copper and/or silver and/or indium and/or platinum and/or palladium and/or nickel so as to optimise the adherence and good electrical conductivity thereof, and provide a colour close to the galvanic plating;
the metallic material deposited in step e) includes gold and/or copper and/or sliver and/or indium and/or platinum and/or palladium and/or nickel;
the method includes a final step g) for the deposition of a substantially transparent layer to protect the decorations from ageing, such as, for example, a layer of silicon nitride.

BRIEF DESCRIPTION OF THE DRAWINGS

Other features and advantages will appear clearly from the following description, given by way of non-limiting indication, with reference to the annexed drawings, in which:

FIG. 1 is a diagram of a timepiece according to the invention;

FIG. 2 is a cross-section of an inlaid ceramic element according to the invention;

DETAILED DESCRIPTION OF PREFERRED EMBODIMENTS

Figure 3:
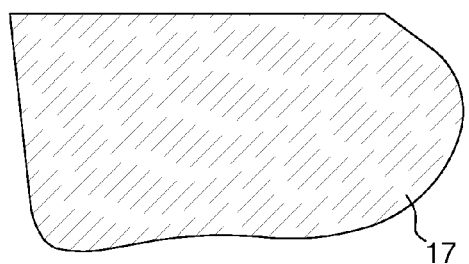
FIGS. 3 to 8 are successive steps of the manufacturing method according to the invention.
Figure 4:
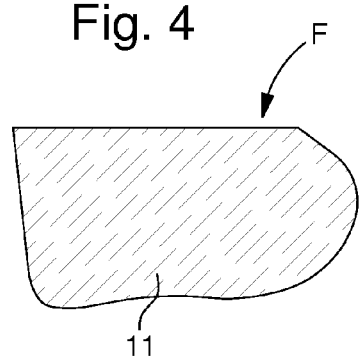

As illustrated in FIG. 1, a timepiece, generally referenced 1, can be seen, including at least one inlaid ceramic element. Each inlaid ceramic element is intended to form a part that is very resistant to wear, including at least one metallic decoration whose visual quality is improved, particularly in terms of contrast.

The inlaid ceramic element according to the invention can form either all or part of the external part of timepiece 1. Thus, it could form all or part of a case 2, bracelet 3, bezel 4, dial 5, crystal 6, push button 7 and/or a crown 8. In the example illustrated below, the explanation of the invention will be given with reference to a ceramic ring, 10 including inlaid decorations 13, forming the scales of a bezel 4.

Figure 8:
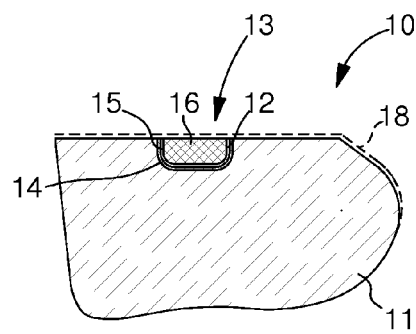

As illustrated in FIGS. 1, 2 and 8, inlaid ceramic element 10 includes a ceramic body 11 including at least one recess 12 forming the pattern for a decoration 13. FIG. 1 shows that each decoration 13, advantageously according to the invention, may have any shape, such as, for example, a geometrical figure or an alphanumerical character. According to the invention, each recess 12 is entirely filled with two, electrically conductive layers 14, 15, each having a thickness of approximately 50 nm and with a galvanic deposition 16 formed by a metallic material. This configuration protects each decoration 13 in ceramic body 11 which is very wear resistant.

In order to improve the adhesion of decoration 13 in body 11, recess 12 preferably has a minimum depth P of 100 μm. Moreover, for the same reasons, each recess 12 preferably has a continuous, at least partially rounded surface R, i.e. the inner surface of the recess has no edges. Indeed, the galvanic depositions may experience filling defects due to the effect of peaks in areas that have edges.

Ceramic body 11 is obtainable from a large variety of materials. However, a zirconia-based ceramic is preferably used for its mechanical properties, polishing ability and, to a lesser extent, for its ability to offer a broad pallet of shades. It is of course clear that other ceramics may be envisaged, such as, for example, titanium carbide-based ceramics.

The first layer 14 is intended to improve the force of adherence of the future decoration 13 on ceramic body 11. In fact, although the micro-roughness of the bottom of recess 12 aids adherence, a first layer 14 is preferably deposited. Preferably, first layer 14 has a thickness of approximately 50 nm and is situated between the second electrically conductive layer 15 and ceramic body 11. According to the method of deposition used for first layer 14, several types of materials may be envisaged, such as, for example, Cr, $Cr_2N$, TiN, TiW, Ni, NiP, Cu, Ti or Zr.

Likewise, for second electrically conductive layer 15 and galvanic deposition 16, it is also possible to envisage a wide variety of materials. Preferably, the second electrically conductive layer 15 is selected to be as close as possible to the colour of galvanic deposition 16. Second layer 15 is also selected for its adherence properties and for its high level of electrical conductivity, which is necessary for electrodeposition.

Moreover, according to the invention, the visual rendering of each decoration 13 is mainly obtained via the colour of galvanic deposition 16. Consequently, the material used for galvanic deposition 16 will preferably be guided by the colour, or more generally, the aesthetic appearance thereof. Therefore, metal galvanic deposition 16 and, incidentally, second layer 15 include gold and/or copper and/or silver and/or indium and/or platinum and/or palladium and/or nickel.

By way of example, it is thus possible to obtain a complex visual rendering by giving ceramic body 11 a shiny appearance and a satin aspect to decorations 13. In order to make the colours uniform, it is also possible to envisage forming decorations 13 in the same material as that surrounding ceramic body 11. One could thus, in an embodiment example of FIG. 1, have decorations 13 of bezel 4 in the same material as case 2, bracelet 3, the rest of bezel 4, dial 5, push buttons 7 and/or crown 8.

Finally, as illustrated in FIG. 8, the inlaid ceramic element 10 may, according to the invention, also provide an optional, substantially transparent layer 18, in order to protect decorations 13 from ageing. This layer 18 may, for example, include silicon nitride to prevent layers 15 and/or 16 from tarnishing especially when the latter are mainly silver-based.

The method 21 of manufacturing an inlaid ceramic element 10 will now be explained with reference to FIGS. 3 to 9. In a first step 22 illustrated in FIG. 9, method 21 consists in forming the ceramic body 11, for example, of zirconia. As is partially shown by the change from FIG. 3 to FIG. 4, the final ceramic body 11 of step 22 is preferably obtained by sintering, i.e. from a green or unfired body 17 preformed via an injection process. At the end of step 22, the body 11 visible in FIG. 4 has its final dimensions.

Figure 5:
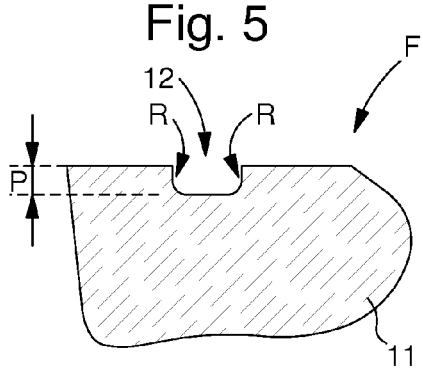
Figure 9:
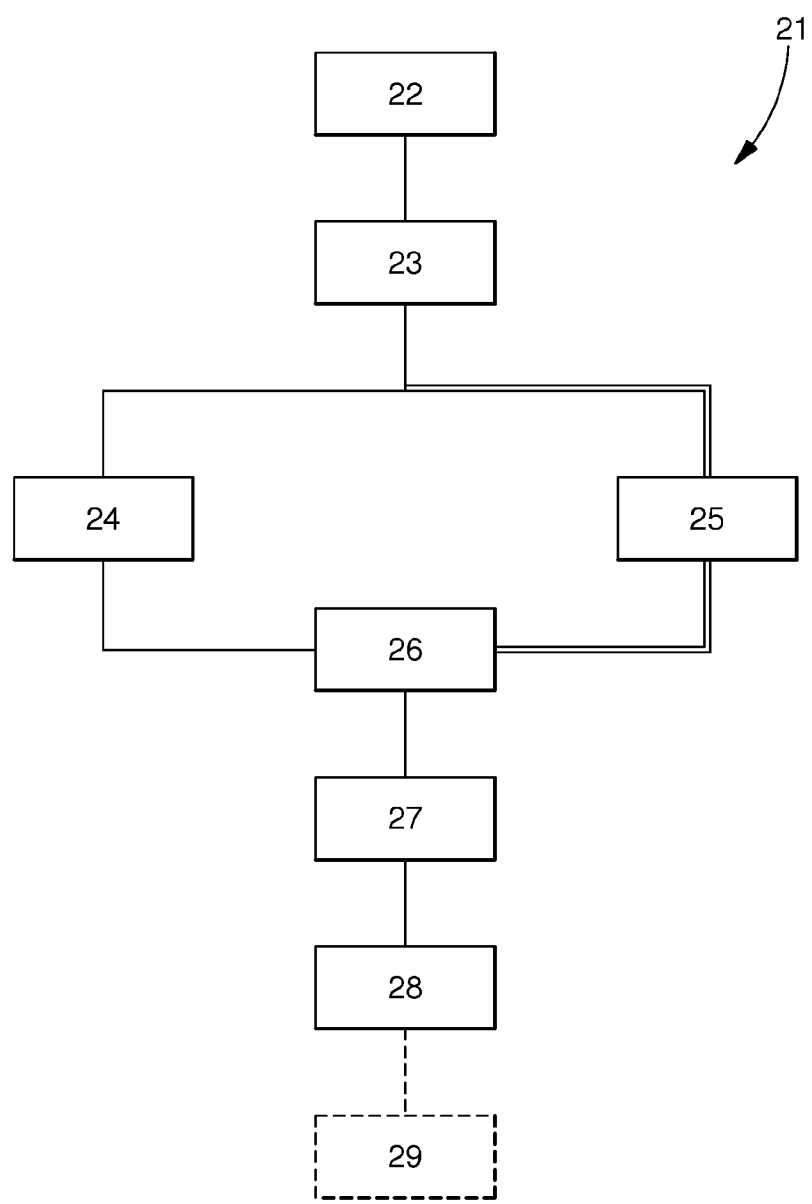
FIG. 9 is a flow diagram of the method according to the invention.

As illustrated in FIG. 9, method 21 includes a second step 23, for etching at least one recess 12, which may be blind, in one face F of ceramic body 11, with recesses 12 forming the pattern for future decorations 13 as visible in FIG. 5. Preferably, each recess 12 has a minimum depth P of 100 μm. Moreover, preferably, each recess 12 has an at least partially rounded surface R in order to facilitate implementation of electrodeposition step 27 explained below. Step 23 is preferably obtained by destructive radiation using a laser in order to obtain highly precise etches.

Figure 6:
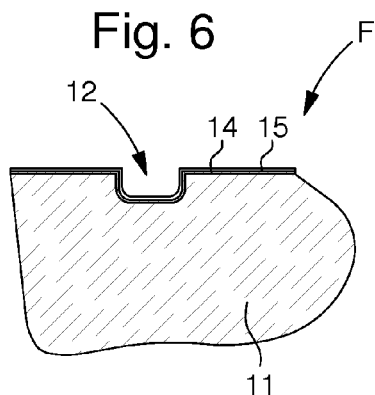

As illustrated in FIG. 9, method 21 continues with a third step for the deposition of a first electrically conductive layer 14 with a thickness of approximately 50 nm over the entire face F, i.e. including each of the recesses 12 therein as seen in FIG. 6. According to the invention, this step can be obtained in accordance with two preferred embodiments.

In a first embodiment, visible in a single line in FIG. 9, the third step 24 of method 21 consists in coating face F using a wet method, such as, for example chemical auto-catalytic or electroless plating. It is thus possible to deposit, for example, a nickel-phosphorus chemical layer which perfectly adheres to ceramic body 11 and which forms a very good adhesion layer for the subsequent step 26.

In a second embodiment, seen in double lines in FIG. 9, the third step 25 of method 21 consists in coating face F using a dry method, such as for example a vapour phase deposition. It is therefore possible to deposit, for example, a Cr, $Cr_2N$, TiN, TiW, Ni, NiP, Cu, Ti or Zr layer that perfectly adheres to ceramic body 11 and which forms a very good adhesion layer for the subsequent step 26.

Whichever embodiment is selected, method 21 continues with a fourth step 26 for depositing a second electrically conductive layer 15 with a thickness of approximately 50 nm over the entire face F, i.e. including in recesses 12, so as to cover first layer 14 so as to offer an optimised surface for the electroplating step 27. As explained above, optimisation applies to the adherence, good electrical conductivity and colour close to galvanic deposition 16.

Consequently, this layer 15 may, for example, be made of gold and/or copper and/or silver and/or indium and/or platinum and/or palladium and/or nickel. Moreover, step 26 is preferably performed using a dry method, such as, for example, vapour phase deposition. In such case, it is clear that, in the case of the first embodiment, step 25 and step 26 may be performed in the same enclosure.

Figure 7:
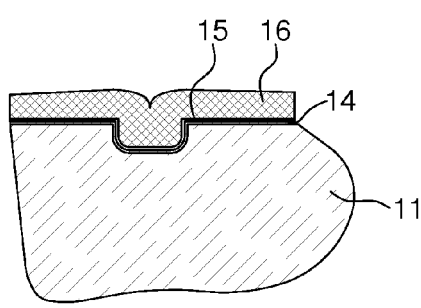

Method 21 continues with a fifth step 27 for the galvanic deposition of a metallic material 16 from conductive layer 15, so as to completely fill each recess 12, as seen in FIG. 7. Preferably, electrolyte renewal in recesses 12 is forced by agitation, i.e. by implementing a forced displacement of the galvanic bath fluids, so as to prevent any filling problems of recesses 12.

As explained above, depending upon the colour or more generally the desired visual rendering, the metallic material deposited in step 27 includes gold and/or copper and/or silver and/or indium and/or platinum and/or palladium and/or nickel.

Finally, in a sixth step 28, method 21 ends with the removal of deposits 14, 15 and 16 from surface F of ceramic body 11 except from each recess 12 as seen in FIGS. 2 and 8. Inlaid ceramic element 10 is thus finished and simply requires assembly in a final part. This step 28 can be obtained by a usual surfacing method such as grinding or lapping to remove any surplus material, followed by polishing.

Method 21 according to the invention may also have an optional final step 29 for depositing a substantially transparent layer 18 so as to protect decorations 13 from ageing. This layer may, for example, include silicon nitride for preventing layers 15 and/or 16 from tarnishing especially when they are mainly silver-based.

Of course, this invention is not limited to the illustrated example but is capable of various variants and alterations that will appear to those skilled in the art. In particular, the application of inlaid ceramic element 10 according to the invention is in no way limited to a timepiece 1. Thus, inlaid ceramic element 10 could, by way of example, be applied to a piece of jewelry or even to tableware.

Moreover, recesses 12 made in step 23 could also be made in the green body 17, i.e. before the end of the sintering process. However, account would then have to be taken of the shrinkage of the final sintered body 11 relative to green body 17. Likewise, recesses 12 are not necessarily blind as in the example illustrated in FIGS. 5 to 8, but may be all or partly through recesses. By close reasoning, at least one recess may have a depth P that is not flat and/or greater than 100 μm.

It is also possible to envisage substituting laser etching in step 23 with another type of etching if the precision and reject rate thereof are acceptable. As in the explanation above, the alternative etch could then also be performed in green body 17 or in the final body 11. This etch may be purely mechanical, such as, for example, milling.

Finally, it should also be noted that step 24 is not limited to auto-catalytic or electroless plating but may alternatively be performed, for example, by vapour phase deposition or ionic bombardment.

What is claimed is:

1. A method of manufacturing an inlaid ceramic element, the method comprising:
    forming a ceramic body, wherein the ceramic body is a zirconia-based ceramic body;
    laser-etching at least one recess in one face of the ceramic body, each at least one recess forming a pattern for a decoration including an inner surface with no edges and having a minimum depth of 100 μm;
    depositing a first layer of approximately 50 nm over an entirety of the one face including said at least one recess;
    depositing a second electrically conductive layer of approximately 50 nm over the entirety of the one face including said at least one recess, so as to cover the first layer;
    depositing galvanically of a metallic material from the second electrically conductive layer so as to completely fill said at least one recess; and
    removing all the deposits from the one face of the ceramic body, except from a hollow of said at least one recess.

2. The method according to claim 1, wherein the forming the ceramic body is achieved by sintering.

3. The method according to claim 1, wherein the depositing the first layer is achieved by electroless plating.

4. The method according to claim 3, wherein the first layer includes nickel-phosphorus.

5. The method according to claim 1, wherein the depositing the first layer is achieved by vapor phase deposition.

6. The method according to claim 5, wherein the first layer is a Cr, $Cr_2N$, TiN, TiW, Ni, NiP, Cu, Ti or Zr layer.

7. The method according to claim 1, wherein the depositing the second electrically conductive layer is achieved by vapor phase deposition.

8. The method according to claim 1, wherein the second electrically conductive layer includes gold and/or copper and/or silver and/or indium and/or platinum and/or palladium and/or nickel so as to optimize an adherence and good electrical conductivity thereof, and provide a color close to a galvanic plating of the metallic material.

9. The method according to claim 1, wherein the metallic material, deposited during the depositing galvanically of the metallic material, includes gold and/or copper and/or silver and/or indium and/or platinum and/or palladium and/or nickel.

10. The method according to claim 1, further comprising depositing a substantially transparent layer so as to protect the decoration from ageing.

11. The method according to claim 10, wherein the substantially transparent layer that protects the decoration from ageing includes silicon nitride.

12. The method according to claim 1, further comprising mounting the inlaid ceramic element, which is formed by the ceramic body with all the deposits removed from the one face of the ceramic body except from the hollow of said at least one recess, to a timepiece.

13. A method of manufacturing an inlaid ceramic element, the method comprising:
    forming a ceramic body, wherein the ceramic body is a titanium carbide-based ceramic body;
    laser-etching at least one recess in one face of the ceramic body, each at least one recess forming a pattern for a decoration including an inner surface with no edges and having a minimum depth of 100 μm;
    depositing a first layer of approximately 50 nm over an entirety of the one face including said at least one recess;
    depositing a second electrically conductive layer of approximately 50 nm over the entirety of the one face including said at least one recess, so as to cover the first layer;
    depositing galvanically of a metallic material from the second electrically conductive layer so as to completely fill said at least one recess; and
    removing all the deposits from the one face of the ceramic body, except from a hollow of said at least one recess.

14. The method according to claim 13, further comprising mounting the inlaid ceramic element, which is formed by the ceramic body with all the deposits removed from the one face of the ceramic body except from the hollow of said at least one recess, to a timepiece.

* * * * *